United States Patent
Rao

(10) Patent No.: US 9,614,833 B1
(45) Date of Patent: Apr. 4, 2017

(54) AUTOMATED CERTIFICATE MANAGEMENT FOR A WEBSITE ASSOCIATED WITH MULTIPLE CERTIFICATES

(71) Applicant: Symantec Corporation, Mountain View, CA (US)

(72) Inventor: Akshata Krishnamoorthy Rao, Atlanta, GA (US)

(73) Assignee: Symantec Corporation, Mountain View, CA (US)

( * ) Notice: Subject to any disclaimer, the term of this patent is extended or adjusted under 35 U.S.C. 154(b) by 54 days.

(21) Appl. No.: 14/530,315

(22) Filed: Oct. 31, 2014

(51) Int. Cl.
*H04L 9/32* (2006.01)
*H04L 29/06* (2006.01)

(52) U.S. Cl.
CPC .............................. *H04L 63/0823* (2013.01)

(58) Field of Classification Search
CPC ................................................. H04L 63/0823
USPC .......................................................... 713/175
See application file for complete search history.

(56) References Cited

U.S. PATENT DOCUMENTS

| | | | |
|---|---|---|---|
| 8,850,185 B1* | 9/2014 | Vaughn | H04L 63/0823 713/155 |
| 2009/0319783 A1* | 12/2009 | Thornton | H04L 63/0823 713/156 |

* cited by examiner

*Primary Examiner* — Mohammad W Reza
(74) *Attorney, Agent, or Firm* — Patterson + Sheridan, LLP

(57) ABSTRACT

Techniques are disclosed to automate the discovery, installation, and renewal of multiple digital certificates deployed on a server application, such as a web server. For example, a management tool may discover and manage multiple digital certificates associated with a server application hosted at an internet protocol (IP) address and port on a server computing system. A certificate management tool examines server configuration data to identify a set of certificates associated with the server application. Based on the information from the configuration data, the tool retrieves and examines each certificate to identify certificate metadata needed to manage the lifecycle of each identified certificate.

20 Claims, 5 Drawing Sheets

AUTOMATED CERTIFICATE MANAGEMENT FOR A WEBSITE ASSOCIATED WITH MULTIPLE CERTIFICATES

BACKGROUND

Field

Embodiments of the invention generally relate to techniques for managing digital certificates installed on a webserver. More specifically, embodiments presented herein are directed to automated approach for managing digital certificates for a single website that is associated with multiple digital certificates.

Description of the Related Art

Providing secure communication and protecting sensitive data is a well-known issue in a broad variety of contexts. For example, it is common for computer servers to use digital certificates to associate a server with a network domain. In such cases, clients use information contained in a certificate to verify the identity of a server and to establish a secure communication session with that server (e.g., an SSL or TLS session with a web server). More generally, digital certificates and public key infrastructure (PKI) techniques are used to create, distribute, and manage cryptographic keys used in a variety of contexts.

Administrators sometimes configure a single web server with multiple digital certificates. For example, one web server may host multiple domains and a different SSL certificate may be configured for each domain. Similarly, a web server may be configured with multiple certificates for a common internet protocol (IP) address and port combination. Doing so allows clients with different capabilities to establish a secure session with the server. That is, clients that connect to the server may request varying types of SSL certificates to establish a secure connection, based on the capabilities of a given client. For example, the certificates may be for different encryption key generation algorithms (e.g., RSA or DSA keys) or for different key sizes or ciphering algorithms. Typically, configuration files on the web server specify what certificates are available to use in establishing secure sessions with clients along with the location of such certificates.

Managing multiple certificates on a server can be a challenge. Some tools are available to automate the discovery, installation, and renewal of certificates configured on a web server. For example, existing solutions typically initiate an SSL handshake with the server in an attempt to identify a certificate configured on that server (which is presented by the server as part of the SSL handshake operation). However, this approach does not address a server configured with multiple SSL certificates for the same website. Instead, it results in one (of possibly) many certificates being discovered by a certificate management tool. Other approaches require an administrator to manually input a path to each certificate files to obtain a copy of the associated digital certificates.

SUMMARY

One embodiment presented herein includes a method for managing a plurality of digital certificates deployed on a server computing system. This method may generally include identifying, in server configuration data stored on the server computing system, two or more digital certificates associated with a first server application hosted at an IP address and port on the server computing system. Each digital certificate is generally used to establish secure communication sessions between the server application and clients. This method may also include recording, for each digital certificate associated with the first server application, metadata indicating at least a validity period and managing a lifecycle of one or more of the digital certificates associated with the first server application based on the recorded metadata.

In a particular embodiment, this method may further include, identifying, in the server configuration data stored on the server computing system, one or more digital certificates associated with a second server application hosted at the IP address and port. This method may further include recording, for each digital certificate associated with the second server application, metadata indicating at least a validity period and managing a lifecycle of each of digital certificate associated with the first server application based on the recorded metadata. Further, managing the lifecycle of one or more of the digital certificates associated with the first server application may itself include identifying one or more of the digital certificates to be renewed based on the recorded validity period, generating, for each of the digital certificates to be renewed, a certificate signing request (CSR) submitted to a issuing certificate authority (CA), and receiving, for each CSR, a digital certificate. Once issued, each replacement digital certificate may be deployed to the server computing system.

Another embodiment includes a computer-readable storage medium storing instructions, which, when executed on a processor, performs an operation for managing a plurality of digital certificates deployed on a server computing system. The operation itself may generally include identifying, in server configuration data stored on the server computing system, two or more digital certificates associated with a first server application hosted at an IP address and port on the server computing system, wherein each digital certificate is used to establish secure communication sessions between the server application and clients. The operation may also include recording, for each digital certificate associated with the first server application, metadata indicating at least a validity period and managing a lifecycle of one or more of the digital certificates associated with the first server application based on the recorded metadata.

Still another embodiment includes a server system having a processor and a memory hosting a certificate discovery and management application, which, when executed on the processor, performs an operation for managing a plurality of digital certificates deployed on the server computing system. The operation itself may generally include identifying, in server configuration data stored on the server computing system, two or more digital certificates associated with a first server application hosted at an IP address and port on the server computing system, wherein each digital certificate is used to establish secure communication sessions between the server application and clients. The operation may also include recording, for each digital certificate associated with the first server application, metadata indicating at least a validity period and managing a lifecycle of one or more of the digital certificates associated with the first server application based on the recorded metadata.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
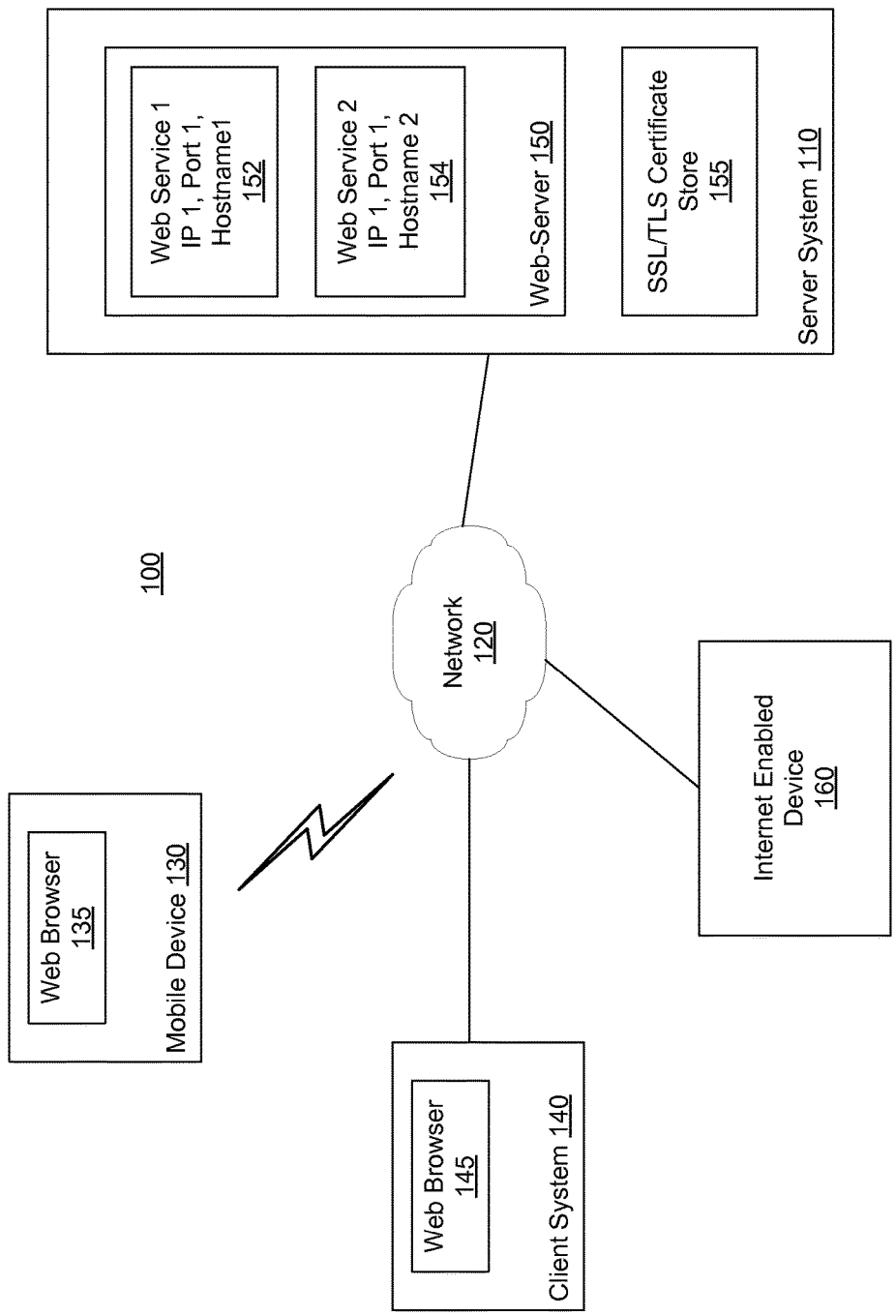
FIG. 1 illustrates an example computing environment, according to one embodiment.

Embodiments presented herein provide techniques to automate the discovery, installation, and renewal of multiple digital certificates configured on a web server. In particular, embodiments presented herein can discover and manage multiple digital certificates associated with a single internet protocol (IP) address and port on a web server, as well as certificates for multiple domains hosted on the same server.

In one embodiment, a certificate management tool identifies the presence of a certificate on a given server by initiating an SSL handshake with the server. If the server presents an SSL certificate in response, then management tool begins managing the lifecycle of certificates installed on that server. Once identified, the management tool identifies the application hosting the SSL certificate and examines the appropriate application server configuration files to identify a set of certificates configured for that application on the server. Based on the information from the configuration files, the tool retrieves and examines each certificate configured on the web server, including, multiple certificates configured for the same IP address and port. When any of the certificates identified from the server configuration files is due for renewal, the tool generates a certificate signing request for each certificate due for renewal and submits the request(s) to an issuing certificate authority (CA). Once received, the certificate may be deployed on the server and the web server configuration files may be modified to point to the new certificate(s). In one embodiment, the renewal process may be performed through automated scripts without requiring user intervention. The scripts may be managed by a tool installed on the server directly, but may also be invoked by an agent on the server in communication with an external management application.

As an example, assume an Apache HTTPD web server is configured with an RSA-DSA certificate pair for a single IP address, port, and hostname combination. In such a case, a management tool initiates an SSL handshake with the server and is presented with one of the certificates on the server (e.g., the RSA server). After determining that the server hosts an Apache HTTPD daemon, the management tool identifies each certificate installed for this IP address, port and hostname combination by parsing the web server configuration files. For example, for an Apache HTTPD web server, the apache.conf configuration files are parsed to find the SSL certificates associated for a single IP address, port and hostname combination. When any of the SSL certificates identified by parsing the configuration files are due for renewal/install—a separate certificate signing request (CSR) and private key is generated for each of the SSL certificates (or a subset, depending on the configuration requirements of the web server). For example, some versions of the Apache HTTPD server require that both an RSA and DSA certificate associated with a single IP address and port share the same private key and intermediate certificates. To satisfy this requirement, the certificate management tool would generate two CSRs and a single key pair for the same IP address and port.

The CSRs are typically signed by a certificate authority, but could also be self-signed, as configured by the tool. However, both the RSA and DSA CSRs would be signed by the same CA signing certificate, so that any intermediate certificate chain would be the same for both the RSA and DSA certificates. Additionally, the configuration for the IP address, port, and hostname combination reflected in the apache.conf configuration file would be modified to install the new certificates. The automated task would be considered complete when all of the certificates are configured for the server. That is, the task would be complete once the paths for both the RSA-DSA certificates have been written into the SSL configuration files.

Note, embodiments of the invention are described below using a web-server as an example of a server application which uses SSL certificates to secure communications between server and client systems. One of ordinary skill in the art will recognize that embodiments described herein may be adapted to manage certificates with a variety of computing applications which use digital certificates to establish secure communication sessions with clients, particularly applications which allow multiple certificates to be configured on a common IP address, port, and hostname combination.

FIG. 1 illustrates an example computing environment 100, according to one embodiment. As shown, the computing environment 100 includes, a server system 110, a mobile device 130, a client system 140, and internet enabled device 160, each connected to a network 120 (e.g., the internet). The server system 110 includes a web-server 150 and an SSL/TLS certificate store 155. The server system 110 is included to be representative of a physical computing system, as well as representative of virtual machine instances deployed to a computing cloud. And web-server 150 is included to be representative of a variety of web-server applications (e.g., Apache or nginix) configured to communicate with client systems using HTTPS and related protocols. Web-server 150 may also communicate with other applications on server system 110 (or other systems), such as an application server and a database to respond to requests from client systems 130 and 140.

Client system 140 is generally included to be representative of a general purpose computing system, such as a desktop or laptop computer. As shown, the client system 140 includes a web-browser 145 used to communicate with web-server 150. Mobile device 130 is generally included to be representative of small mobile computing devices, such as smart phones and computing tablets. Like client system 140, the mobile device 130 executes a web-browser 135 in order to communicate with web-server 150. Internet-enabled device 160 generally includes any other device capable of communicating over network 120, e.g., consumer products such as thermostats, appliances, televisions, etc. that include a network interface—sometimes referred to as "the internet of things." Device 160 may include a web-client used to establish a communication session (including secure sessions) with web-server 150. More generally, web browser 135, web browser 145, and device 160 may be capable of establishing a secure communication session with a web server 150, e.g., by initiating an SSL or TLS handshake with a service at a given IP address and port combination. Further, the request may specify capabilities (or preferences) of the client for the secure session. As part of the handshake, a web server may present a digital certificate (and public key) used by the client in order to complete the handshake and establish a secure session.

As shown, the web server 150 is configured to host two different web services, labeled as web service 152 and web service 154. In this example, web service 1 (152) and web service 2 (154) share a common IP address and port, but have different host names. For example, when establishing a connection, a client supporting the Sever Name Indication extension to the TLS protocol may supply an indication of which web service (152 or 154) hosted by web server 150 should process a given request.

In one embodiment, SSL/TLS certificate store 155 may store multiple certificates for web service 1 (152), each associated with the same IP Address, port, and hostname. For example, SSL/TLS certificate store 155 may host an RSA and DSA certificate, as well as an ECC certificate. The certificate store 155 could also include multiple RSA (or other certificates based on the same encryption algorithm) which have different attributes, e.g., two certificates with different key sizes, use attributes, or certificates signed by different certificate authorities (CAs). Similarly, SSL/TLS certificate store 155 may store multiple certificates for web service 2 (154). As described below, in one embodiment, a certificate management tool may be configured to automate the discovery, installation, and renewal of certificates in the SSL/TLS certificate store 155. That is, the certificate management tool may automate the certificate lifecycle of certificates deployed on the server 110

Figure 2:
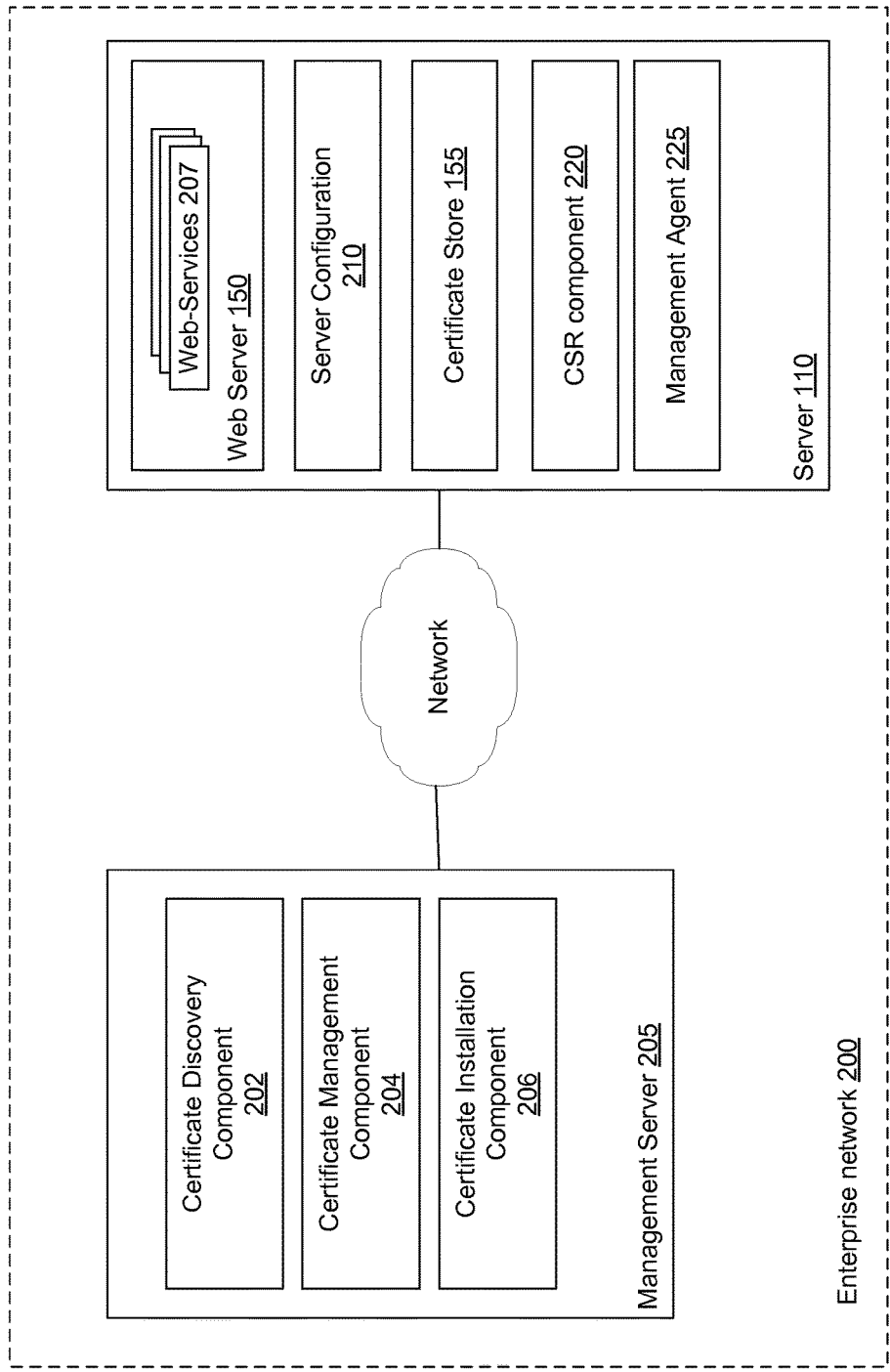
FIG. 2 illustrates an example certificate discovery and management tool, according to one embodiment.

For example, FIG. 2 illustrates an example certificate discovery and management tool 203, according to one embodiment. As shown, an enterprise network 200 includes the server 110 and a management server 205. The server 110 includes the web-server 150 and certificate store 155 discussed above relative to FIG. 1. In addition, the server 110 includes web server configuration data 210 and a certificate signing request (CSR) component 220. In one embodiment, the web server configuration 210 identifies what web services 207 are hosted by the server (e.g., for an Apache web server, by defining multiple virtual host configurations in an apache.conf configuration file) as well as what digital certificates in certificate store 155 are associated with each hosted web service. As noted, e.g., a website configured over a given IP address, port, and hostname could have an RSA, DSA, and ECC based certificate available to establish secure communications sessions with clients.

As shown, management server 205 includes a management application 203 configured to automate the discovery, installation and renewal of digital certificates 155, particularly where multiple certificates are installed for given website. Illustratively, the management server 203 includes a certificate discovery component 202, a management component 204, and an installation component 206. In one embodiment, the certificate discovery component 202 is configured to determine whether a server hosts an application secured using an SSL/TLS certificate. For example, the discovery component 202 may initiate an SSL/TLS handshake with the web server 150. Provided the web server 150 presents a certificate to the discovery component 202 in response to the handshake, then the discovery component 202 establishes a connection with the server 110. For example, the discovery 200 may establish a shell connection with the server or connect to a management agent 225 installed on the server 110. Once connected, the certificate discovery component 202 parses the web-server configuration 210 to identify each hosted web service and one or more certificates associated with each such web service. That is, rather than identify only one certificate by initiating an SSL/TLS session handshake with the web server 150, the discovery component 202 evaluates the web server configuration 210 to identify all certificates available to establish such sessions in the certificate store 155. Once identified, the certificate discovery component 202 retrieves a copy of each certificate and identifies attributes, such as an issuer, validity period or expiration date, and certificate chain (if any). The management component 204 may schedule a renewal at a specified time prior to the expiration, e.g., one month.

In turn, when a set of certificates associated with a given web site is due for renewal, the certificate management component 204 may cause the CSR component 220 to request a new certificate. To do so, the CSR component 220 generates a private/public key pair. The public key and desired certificate attributes are stored in the CSR. Depending on the server configuration, a new private/public key pair may be generated for multiple certificates or the same private key may be used for multiple certificate requests. For example, some versions of the Apache HTTPD server require that both an RSA and DSA certificate associated with a single IP address and port share the same private key and intermediate certificates.

The CSRs are then sent to a CA which issues the requested certificates. In turn, the certificate installation component 206 installs the new set of certificates on the server 110. For example, the certificate installation component 206 writes a copy of each new certificate to the certificate store 155 on the local file system of the server 110 and modifies the web server configuration 210 to reference the newly installed certificates.

Note, while management server 205 and server 110 are shown as distinct computing systems connected on an enterprise network 200, the management application 203 could be installed on the server 110. In such a case, the application 203 could access the web server configuration 210 directly over a locally mounted file system.

Figure 3:
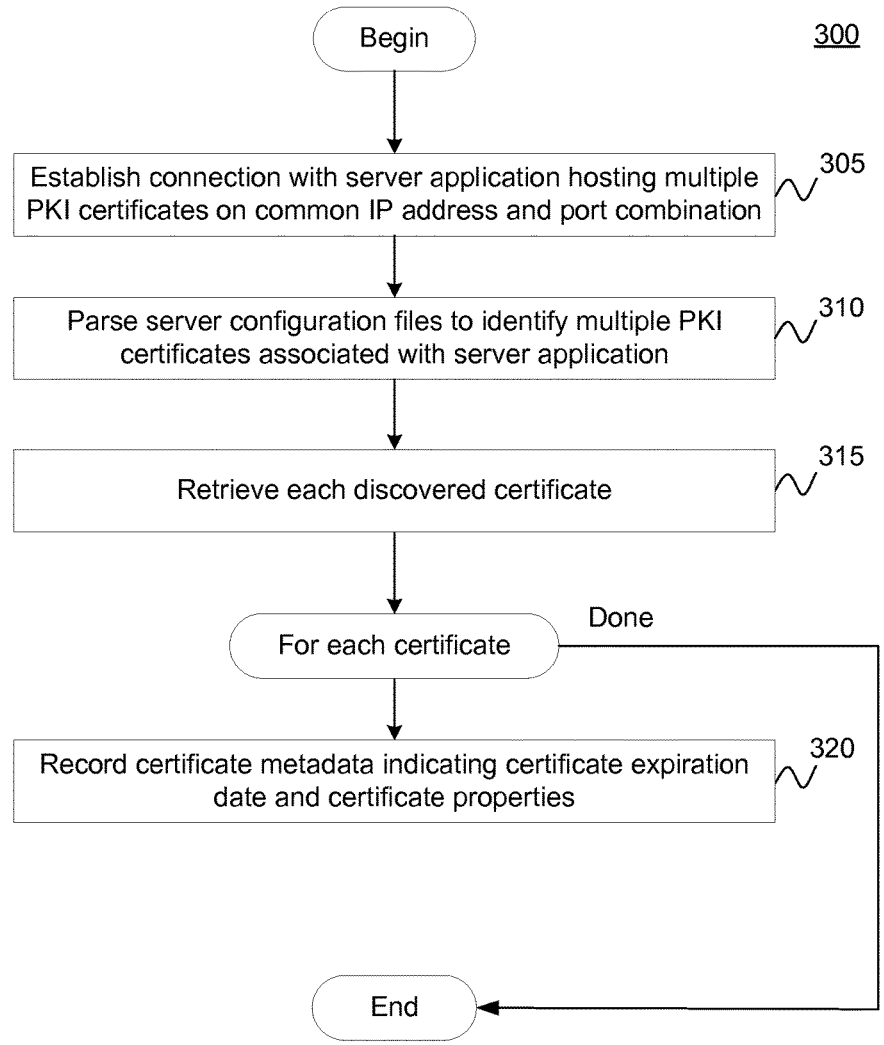
FIG. 3 illustrates a method to automate the certificate discovery of multiple digital certificates associated with a common IP address, port, and hostname, according to one embodiment.

FIG. 3 illustrates a method 300 to automate the certificate discovery of multiple digital certificates associated with a common IP address, port, and hostname, according to one embodiment. As shown, the method 300 begins at step 305 where a management application establishes a connection to a server hosting a web server (e.g., Apache HTTPD). As noted, the management application may establish a connection to the server after initiating an SSL/TLS handshake with the server and being presented with a single digital certificate in response. Such a connection could be a shell connection (e.g., ssh) or could be a connection to a dedicated network agent. As noted, the web server may support both multiple hosts accessed on a common IP address and port, as well as support multiple digital certificate for a given IP address, port, and hostname combination. Once connected, the management application pareses web server configuration data (e.g., files in an apache.conf directory) to identify each configured virtual host and any digital certificates deployed for each virtual host (step 310).

At step 315, the management application retrieves a copy of each certificate discovered while parsing the web server configuration files. For each certificate, the management application records metadata or attributes of the certificate (step 320). For example, the application could record an validity period, expiration date and an indication of sets of certificates associated with a common IP address, port, and hostname combination. The application can then schedule a certificate renewal at a specified time prior to the validity period of each certificate set of certificates associated with a given IP address, port, and hostname combination.

Figure 4:
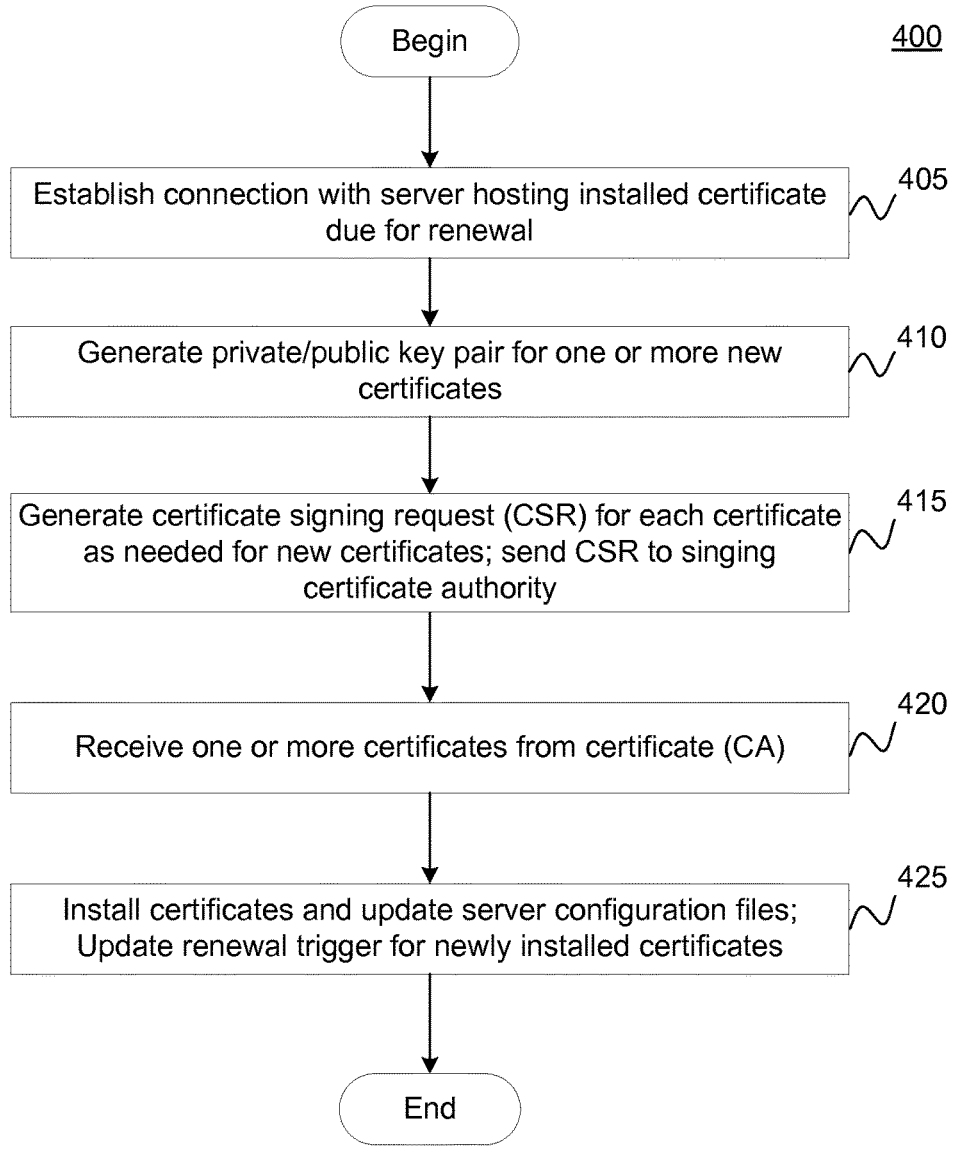
FIG. 4 illustrates a method for renewing, configuring and installing multiple digital certificates associated with a common IP address, port and hostname, according to one embodiment.

FIG. 4 illustrates a method 400 for renewing, configuring and installing multiple digital certificates associated with a common IP address, port and hostname, according to one embodiment. As shown, the method 400 begins at step 405 where the discovery and management tool establishes a connection with a server hosting installed certificate due for renewal. As noted, the connection may be a shell connection or a connection to a dedicated network agent on the server. Of course, if the discovery and management tool is installed on the same computing system as the server, step 405 may be omitted.

At step 410, the discovery and management tool generates, on the server system hosting the web server, a private/public key pair for each certificate being renewed on the server. For example, keygen (for Java), openssl (for Apache), certutil (for IIS), may used to create a new private/public key pair. At step 415, the discovery and management tool generates a certificate signing request (CSR) for each new certificate and submits the request to an issuing certificate authority. At step 420, the discovery and management tool receives the requested certificates from the issuing certificate authority. Once received, the discovery and management tool installs each certificate on the server. For example, the discovery and management tool may write a copy of each certificate (and certificates in an associated certificate chain, if any) to a certificate store on the server, as well as update web server configuration files to reference the newly installed certificates.

Figure 5:
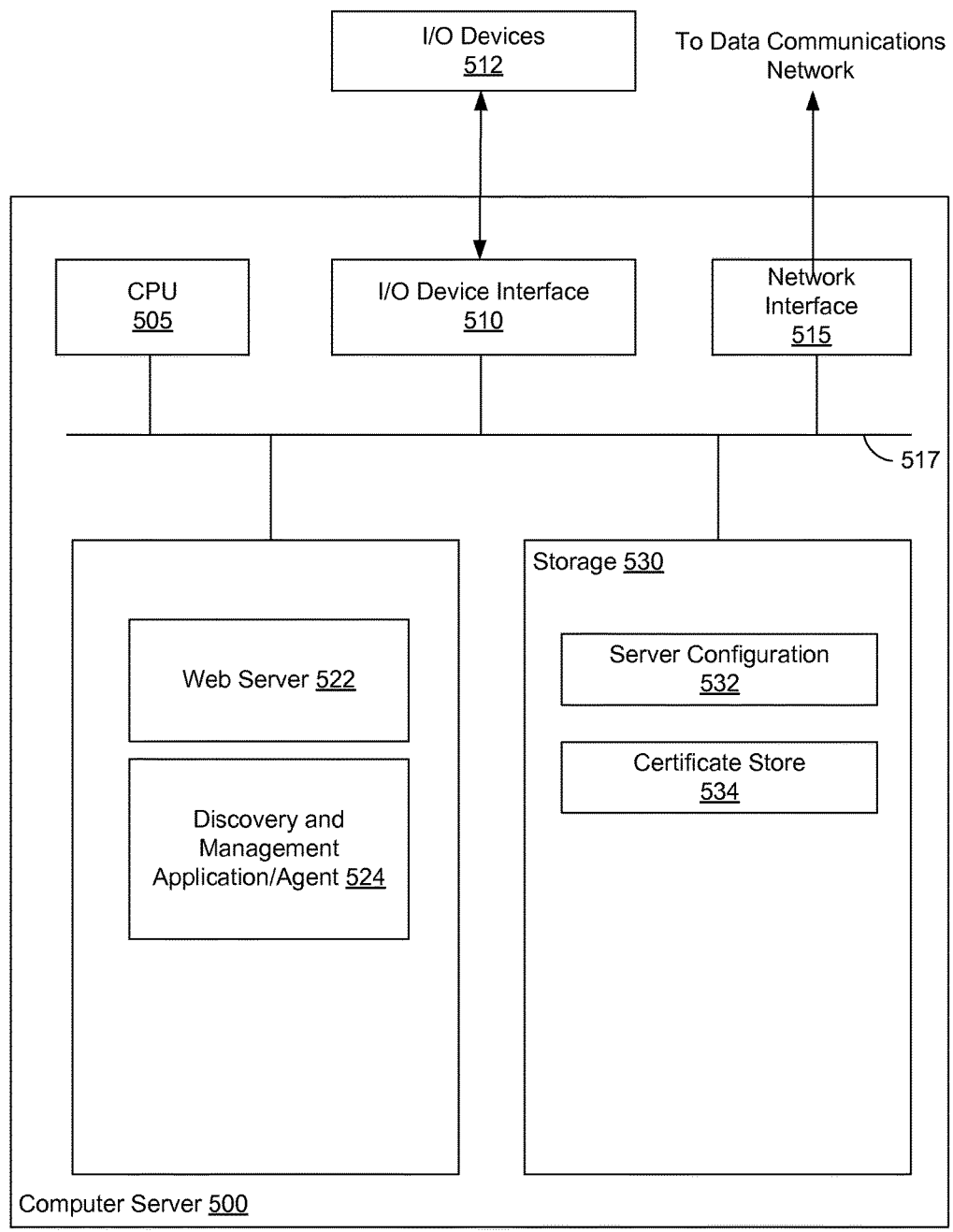
FIG. 5 illustrates an example computing system configured to automate the certificate discovery of multiple digital certificates associated with a common IP address, port, and hostname, according to one embodiment.

FIG. 5 illustrates an example computing system 500 configured to automate the certificate discovery of multiple digital certificates associated with a common IP address, port, and hostname, according to one embodiment. As shown, the computing system 500 includes, without limitation, a central processing unit (CPU) 505, a network interface 515, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, optical storage, network attached storage (NAS), or a storage area-network (SAN).

Illustratively, the memory 520 includes a web server 522 and a discovery and management tool 524 (or an agent that communicates with the discovery and management tool. And the storage 530 includes server configuration data 324 and an SSL/TLS certificate store.

As described, the web server 522 may host a website having an IP address, port, and hostname. In addition, the web server 522 may have multiple digital certificates (e.g., an RSA and DSA certificate) available to present to clients requesting to establish a secure communication session. The discovery and management tool 524 automates the discovery, installation, and renewal lifecycle of such certificates. As described, the management tool 524, or an agent on the server 500 communicating with the management tool on another server, may discover the certificates by parsing the web server configuration data 532 to identify each digital certificate associated with a given an IP address, port, and hostname combination. This may occur for multiple configured hosts (e.g., for multiple virtual host configurations). Once discovered the management tool 524 may retrieve and identify metadata associated with each certificate as needed to manage a certificate renewal process. For example, the management tool 524 may renew a set of certificates for a common an IP address, port, and hostname combination at specified time prior to an expiration of a certificate validity period. Once renewed, the management tool may add the certificates to the certificate store 534 and update server configuration 532.

In the preceding, reference is made to embodiments of the invention. However, the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Users can access any of the computing resources that reside in the cloud at any time, from anywhere across the Internet. For example, in context of this disclosure, a web-server controlled and operated by one party, but hosted on a cloud-computing environment, could be deployed with multiple digital certificates on a given an IP address, port, and hostname combination. In such a case, an agent installed on the cloud-based web server could communicate with the certificate discovery and management tool discussed above to automate the certificate lifecycle for such certificates.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing a plurality of digital certificates deployed on a server computing system, the method comprising:
   identifying, in server configuration data stored on the server computing system, two or more digital certificates associated with a first server application hosted at an IP address and port on the server computing system, wherein each digital certificate is used to establish secure communication sessions between the server application and clients;
   recording, for each digital certificate associated with the first server application, metadata indicating at least a validity period; and
   managing a lifecycle of one or more of the digital certificates associated with the first server application based on the recorded metadata.

2. The method of claim 1, further comprising:
   identifying, in the server configuration data stored on the server computing system, one or more digital certificates associated with a second server application hosted at the IP address and port;
   recording, for each digital certificate associated with the second server application, metadata indicating at least a validity period; and
   managing a lifecycle of each of digital certificate associated with the first server application based on the recorded metadata.

3. The method of claim 2, wherein the first server application and the second server application have distinct hostnames.

4. The method of claim 1, wherein managing the lifecycle of one or more of the digital certificates associated with the first server application:
   identifying one or more of the digital certificates to be renewed based on the recorded validity period;
   generating, for each of the digital certificates to be renewed, a certificate signing request (CSR) submitted to a issuing certificate authority (CA);
   receiving, for each CSR, a digital certificate; and
   deploying each replacement digital certificate on the server computing system.

5. The method of claim 1, wherein deploying each replacement digital certificate on the server computing system includes updating the server configuration data to reference each replacement certificate.

6. The method of claim 1, wherein the two or more digital certificates associated with the first server application each employ a distinct key generation algorithm.

7. The method of claim 1, wherein the server application is a web server hosting one or more websites, and wherein the configuration data stored on the server computing system provides configuration data for each of the one or more web sites.

8. A non-transitory computer-readable storage medium storing instructions, which, when executed on a processor, performs an operation for managing a plurality of digital certificates deployed on a server computing system, the operation comprising:
   identifying, in server configuration data stored on the server computing system, two or more digital certificates associated with a first server application hosted at an IP address and port on the server computing system, wherein each digital certificate is used to establish secure communication sessions between the server application and clients;

recording, for each digital certificate associated with the first server application, metadata indicating at least a validity period; and managing a lifecycle of one or more of the digital certificates associated with the first server application based on the recorded metadata.

9. The computer-readable storage medium of claim 8, wherein the operation further comprises:

identifying, in the server configuration data stored on the server computing system, one or more digital certificates associated with a second server application hosted at the IP address and port;

recording, for each digital certificate associated with the second server application, metadata indicating at least a validity period; and managing a lifecycle of each of digital certificate associated with the first server application based on the recorded metadata.

10. The computer-readable storage medium of claim 9, wherein the first server application and the second server application have distinct hostnames.

11. The computer-readable storage medium of claim 8, wherein managing the lifecycle of one or more of the digital certificates associated with the first server application:

identifying one or more of the digital certificates to be renewed based on the recorded validity period;

generating, for each of the digital certificates to be renewed, a certificate signing request (CSR) submitted to a issuing certificate authority (CA);

receiving, for each CSR, a digital certificate; and deploying each replacement digital certificate on the server computing system.

12. The computer-readable storage medium of claim 8, wherein deploying each replacement digital certificate on the server computing system includes updating the server configuration data to reference each replacement certificate.

13. The computer-readable storage medium of claim 8, wherein the two or more digital certificates associated with the first server application each employ a distinct key generation algorithm.

14. The computer-readable storage medium of claim 8, wherein the server application is a web server hosting one or more websites, and wherein the configuration data stored on the server computing system provides configuration data for each of the one or more web sites.

15. A server computing system, comprising:

a processor; and a memory hosting a certificate discovery and management application, which, when executed on the processor, performs an operation for managing a plurality of digital certificates deployed on the server computing system, the operation comprising:

identifying, in server configuration data stored on the server computing system, two or more digital certificates associated with a first server application hosted at an IP address and port on the server computing system, wherein each digital certificate is used to establish secure communication sessions between the server application and clients, recording, for each digital certificate associated with the first server application, metadata indicating at least a validity period, and managing a lifecycle of one or more of the digital certificates associated with the first server application based on the recorded metadata.

16. The system of claim 15, wherein the operation further comprises:

identifying, in the server configuration data stored on the server computing system, one or more digital certificates associated with a second server application hosted at the IP address and port;

recording, for each digital certificate associated with the second server application, metadata indicating at least a validity period; and managing a lifecycle of each of digital certificate associated with the first server application based on the recorded metadata.

17. The system of claim 16, wherein the first server application and the second server application have distinct hostnames.

18. The system of claim 15, wherein managing the lifecycle of one or more of the digital certificates associated with the first server application:

identifying one or more of the digital certificates to be renewed based on the recorded validity period;

generating, for each of the digital certificates to be renewed, a certificate signing request (CSR) submitted to a issuing certificate authority (CA);

receiving, for each CSR, a digital certificate; and deploying each replacement digital certificate on the server computing system.

19. The system of claim 15, wherein deploying each replacement digital certificate on the server computing system includes updating the server configuration data to reference each replacement certificate.

20. The system of claim 15, wherein the server application is a web server hosting one or more websites, and wherein the configuration data stored on the server computing system provides configuration data for each of the one or more web sites.

* * * * *